F. E. BLAISDELL.
METHOD OF MANUFACTURING IMPROVED TUBING.
APPLICATION FILED SEPT. 15, 1920.
1,361,001.
Patented Dec. 7, 1920.
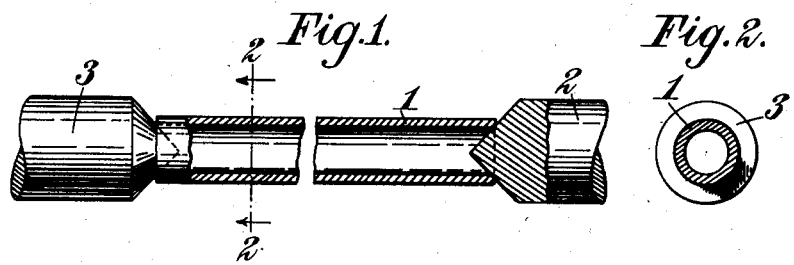
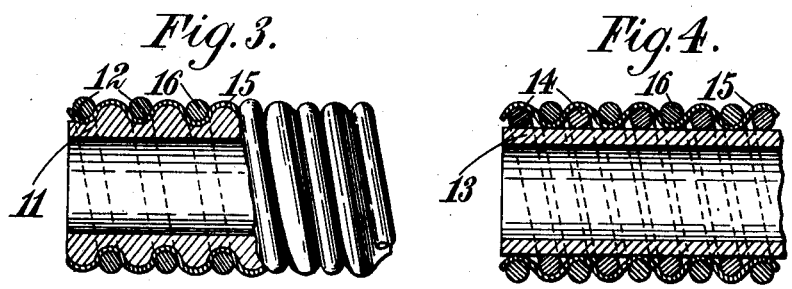
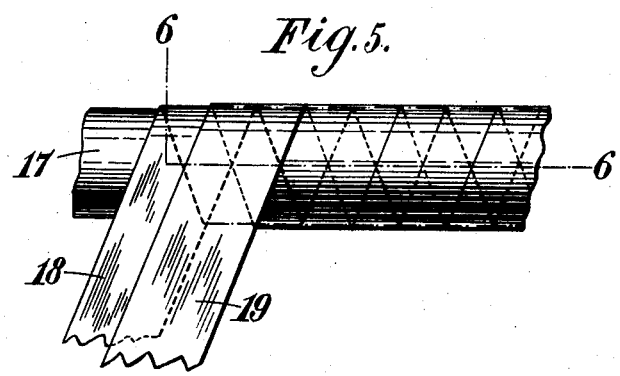
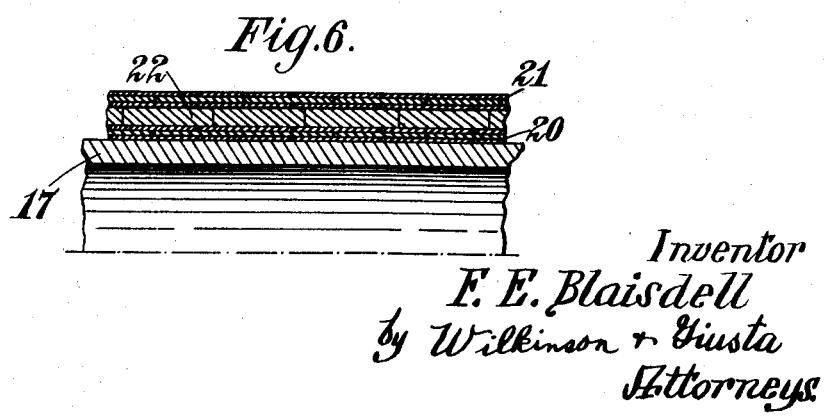
Inventor
F. E. Blaisdell
by Wilkinson & Giusta
Attorneys

UNITED STATES PATENT OFFICE.

FREDERICK ELIJAH BLAISDELL, OF BUSHEY, ENGLAND.

METHOD OF MANUFACTURING IMPROVED TUBING.

1,361,001.   Specification of Letters Patent.   Patented Dec. 7, 1920.

Application filed September 15, 1920. Serial No. 410,553.

*To all whom it may concern:*

Be it known that I, FREDERICK ELIJAH BLAISDELL, citizen of the United States of America, residing at Bushey, Herts, England, have invented certain new and useful Methods of Manufacturing Improved Tubing, of which the following is a specification.

This invention is for improvements in or relating to conduits or containers for petrol, oil and the like, and to the method of manufacturing the same, and has for one of its objects the production of conduits or containers which while being thoroughly petrol and oil proof are flexible and extensible within limits and of considerable strength against both internal and external pressure. Another object of the invention is to provide an improved method of manufacturing such conduits or containers, which method shall permit of reliable conduits or containers being prepared in a satisfactory and efficient manner.

The conduits or containers consist of layers (for example continuous tubular layers or layers of spirally wound ribbon) of animal gut or intestines such as the gut or intestines of oxen, sheep or pigs. An adhesive may be added between adjacent layers to assist cohesion if desired, and the gut or intestines may be treated with glycerin before building up the conduit or container to increase the flexibility of the finished article. Preferably the conduit or container is molded into corrugated shape for the purpose of assisting it to retain its cross-sectional shape during bending and generally to strengthen it. An internal or external armoring of wire, or both internal and external winding may also be employed for giving increased strength, and to render the conduit or container impervious to moisture it may be treated with potassium bichromate or the like or have some other moisture-proof material or compound applied to it. An intermediate strengthening layer of fabric or the like or an external protecting covering of rubber, fabric or other suitable material may be provided.

For a more complete understanding of the invention certain specific embodiments thereof will now be described, by way of example only, and with reference to the accompanying drawings. It is to be understood, however, that the invention is not limited to the precise details enumerated.

In these drawings:—

Figure 1 is a side elevation, mainly in section, of a former for use in building up conduits or containers according to the present invention.

Fig. 2 is a cross-section on the line 2—2 of Fig. 1.

Fig. 3 is a side elevation, partly in section, of a portion of a corrugated former for use in manufacturing conduits or containers according to the present invention. The former of Fig. 3 is shown on a larger scale than the former of Figs. 1 and 2.

Fig. 4 is a longitudinal section, on the same scale as Fig. 3, of a modified construction of former for manufacturing conduits or containers.

Fig. 5 is a view showing a method of building up conduits or containers according to the present invention from ribbons of gut or intestines, and Fig. 6 is a section on the line 6—6 of Fig. 5, with the parts drawn on a much enlarged scale for the sake of clearness.

Like reference numerals refer to like parts throughout the drawings.

The material used for the conduits or containers is tubular animal gut or intestines. Gut or intestines from pigs are in some respects the most suitable but those from sheep or oxen can also be used. These intestines from the animal are extremely thin, for example a conduit consisting of eight layers only measures .01 of an inch in thickness and one of twenty layers only measures .025 of an inch in thickness. In diameter they vary considerably, thus .625 of an inch to 1.5 of an inch is common, but they can be obtained of considerably larger diameter. The length also varies considerably but in practice it is found convenient to cut the intestines into lengths of about ten feet; any other suitable lengths may, however, be used.

The gut or intestines should be used in a wet condition. It is usual to extract the gut or intestines from the animal and clean and salt them for preservative purposes until they are required for use. Materials received in this condition should, therefore, be washed to remove the salt before using and so as to render them flexible and wet.

To increase the flexibility of the conduit or container the gut or intestines may be soaked in glycerin, preferably diluted, before being built up, and to assist the cohesion of adjacent layers an adhesive may be added. This adhesive is not always necessary since, while in their wet state, the intestines are sometimes sufficiently gelatinous to adhere to one another when subjected to slight pressure. A convenient method of procedure, however is to wash the intestines, pass them through a wringer and then immerse them in a preparation of glycerin and gelatinous substance, such as fish glue, gelatin, or the like.

The desired strength of conduit or container is obtained by superimposing several layers of gut or intestines by drawing the latter one over the other, the first one being drawn over a tubular former. A suitable construction of former is illustrated in Figs. 1 and 2. It comprises a tubular shell 1 which in use may be supported upon tapered centers 2, 3 the intestines being threaded first upon one or both of the centers 2, 3 and then transferred to the former 1. The internal construction of the former will permit of the passage of a heating medium such as say hot water or steam. The former 1 may be made of any desired length.

The intestines are intended to be drawn on to the former 1, one over the other, until the desired thickness is obtained. They should then be subjected to a slight pressure, such for example as can easily be applied by hand, to cause them to conform to the size and shape of the former 1, and to exclude air. It is a peculiarity of the gut or intestines that they shrink considerably in drying, so that if say a number of tubes of one inch to 1.25 inches diameter are placed over a former of .375 inches diameter they will shrink, in drying, to the size of the latter without the formation of objectionable creases if air bubbles are carefully excluded and the drying proceeds slowly.

After the requisite number of intestines have been placed over the former 1 as just described, they are allowed to dry and shrink. This drying and shrinking may take place in an artificial atmosphere or in the air. In the latter case it may occupy about forty-eight hours. The products thus obtained, which will be a plain cylindrical conduit or container is then removed from the former 1, and may either be used in its present condition or be further treated as hereinafter indicated.

As already indicated the intestines, whether or not an adhesive has been added to them, are sticky. To facilitate their removal from the former when dry, the latter may include in its effective diameter a readily removable outer portion applied to the former which will be in direct contact with the innermost of the layers of intestines. Thus the former may, before the first intestine is drawn over it, be coated with wax, say bees wax. Then, when it is desired to remove the dried product consisting of several superimposed layers of intestines, the wax on the former 1 is melted by passing a heating medium through the interior of the former. The conduit or container can then readily be detached. Or before detaching a fabric cover may be applied over the gut.

As already indicated, the plain cylindrical conduit or container, prepared as above described, may be used in its present shape, but it is preferable in some cases that it should be corrugated in order to assist it to retain its cross-sectional shape during bending, and generally to add to its strength and utility. For the purpose of being corrugated, the gut is drawn over a corrugated former or over a plain former having a detachable corrugated surface. Fig. 3 shows a former 11 having external spiral corrugations 12 formed in it. Fig. 4 shows a plain former 13 with a detachable spiral 14 of wire upon it. It will readily be appreciated that in both of these constructions a corrugated surface is exposed to the intestines, which in these two figures is indicated at 15.

The conduit or container, after it has been drawn over the former 11 or 13 is damped, if necessary, and then molded to the shape of the corrugations by applying pressure to it. This may conveniently be done by binding upon it a coil of wire 16 with its convolutions alternating with the ribs on the former 11 or with the convolutions of the wire 14 upon the former 13. The conduit or container is then, if previously damped, permanently dried and removed from the former 11 or 13 as the case may be. It may be unscrewed off the former 11 while the former 13 can readily be pulled out from inside it. The coils of wire 14 and 16 may either be detached by unscrewing and the conduit used in its corrugated shape without wire additions, or the wires 14 and 16 may be left in position to serve as an armoring for the gut conduit or container.

It is not essential to build up the conduit or containers from a number of tubular layers as before described. Instead of this, the gut may be formed into a ribbon and wound spirally around the former as indicated in Fig. 5. In this figure upon the former 17 two ribbons 18 and 19 of gut are in process of being wound. The former 17 may be similar in construction to the former 1 if desired, and the gut ribbons 18 and 19 may be treated in a similar manner to that described above for the tubular gut. Obviously a cylindrical conduit or container made in the manner illustrated in Fig. 5 may be subsequently corrugated in the manner hereinbefore described. The conduit may be reinforced by the introduction of an intermediate strengthening layer of fabric or the like. This latter modification is illustrated in Fig. 6 in which, on an enlarged scale, internal and external layers of gut are indicated at 20 and 21 respectively together with an intermediate layer 22 of some strengthening material such as fabric. Obviously a container made in accordance with Fig. 6 may subsequently be corrugated as hereinbefore described.

The conduits or containers may be rendered impervious to moisture by being covered with impregnated or moisture-proof fabric or by being treated with potassium bi-chromate or other soluble metallic bi-chromates, or the like. Further, the surfaces of the conduits or containers may be coated with any suitable flexible varnish, such as dissolved pyroxylin with a softening agent such as oil added to it. An external protecting covering of canvas or other suitable material, such as is indicated at 22 in Fig. 6, may be provided for the conduit or container. This should be placed in position after the intestines have dried and shrunk.

Instead of employing wire for molding the gut to conform to the corrugations on the former, some other flexible binding such as cord may be applied if desired.

The coverings of the conduits or containers may be impregnated or otherwise treated with a fireproofing material to render them non-inflammable.

What I claim as my invention and desire to secure by Letters Patent is:—

1. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a corrugated former, and (f) molding the material of the conduit or container to the shape of the corrugation by applying pressure to it.

2. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a plain former with a detachable corrugated surface thereon, and (f) molding the material of the conduit or container to the shape of the corrugations by applying pressure to it.

3. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a plain former with a coil of wire thereon, and (f) molding the material of the conduit or container to corrugated shape by applying pressure to it.

4. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a spirally corrugated former, and (f) molding the material of the conduit or container to corrugated shape by applying pressure to it by binding upon it a coil of wire with its convolutions alternating with the said corrugations.

5. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a plain former with a detachable spiral coil of wire thereon, and (f) molding the material of the conduit or container to corrugated shape by applying pressure to it by binding upon it a spiral coil of wire with its convolutions alternating with the convolutions of the aforesaid other coil of wire.

6. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a plain former with a detachable spiral coil of wire thereon, (f) molding the material of the conduit or containers to corrugated shape by applying pressure to it by binding upon it a spiral coil of wire with its convolutions alternating with the convolutions of the aforesaid other coil of wire, and (g) detaching the conduit or container from the former and leaving the outer of said coils of wire in position thereon to serve as armoring.

7. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a plain former with a detachable spiral coil of wire thereon, (f) molding the material of the conduit or container to corrugated shape by applying pressure to it by binding upon it a spiral coil of wire with its convolutions alternating with the convolutions of the aforesaid other coil of wire, and (g) detaching the conduit or container from the former while leaving the said coils of wire in position thereon to serve as armoring.

8. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) detaching the product thus formed from the former, (e) placing the conduit or container upon a corrugated former, (f) damping the material of the conduit or container, (g) molding the material of the conduit or container to the shape of the corrugations by applying pressure to it, and (h) finally drying the conduit.

9. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) placing upon the outer surface of the said layers a layer of fabric, (e) detaching the product thus formed from the former, (f) placing the conduit or container upon a corrugated former, and (g) molding the material of the conduit or container to the shape of the corrugations by applying pressure to it.

10. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) placing upon the outer surface of the said layers a layer of fabric, (e) detaching the product thus formed from the former, (f) placing the conduit or container upon a plain former with a detachable spiral coil of wire thereon, (g) molding the material of the conduit or container to corrugated shape by applying pressure to it by binding upon it a spiral coil of wire with its convolutions alternating with the convolutions of the aforesaid other coil of wire, and (h) detaching the conduit or container from the former and leaving the outer of said coils of wire in position thereon to serve as armoring.

11. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) placing upon the outer surface of the said layers a layer of fabric, (e) detaching the product thus formed from the former, (f) placing the conduit or container upon a plain former with a detachable spiral coil of wire thereon, (g) molding the material of the conduit or container to corrugated shape by applying pressure to it by binding upon it a spiral coil of wire with its convolutions alternating with the convolutions of the aforesaid other coil of wire, and (h) detaching the conduit or container from the former while leaving the said coils of wire in position thereon to serve as armoring.

12. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) applying outside said layers a moisture-proof coating, (e) detaching the product thus formed from the former, (f) placing the conduit or container upon a corrugated former, and (g) molding the material of the conduit or container to the shape of the corrugations by applying pressure to it.

13. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) applying outside said layers a moisture-proof coating, (e) detaching the product thus formed from the former, (f) placing the conduit or container upon a plain former with a detachable spiral coil of wire thereon, (g) molding the material of the conduit or container to corrugated shape by applying pressure to it by binding upon it a spiral coil of wire with its convolutions alternating with the convolutions of the aforesaid other coil of wire, and (h)

detaching the conduit or container from the former and leaving the outer of said coils of wire in position thereon to serve as armoring.

14. The method of manufacturing a fluid conduit or container which consists in:— (a) placing layers of wet gut or intestine concentrically upon a former, (b) applying pressure to the layers to cause them to conform to the shape of the former, (c) drying and shrinking the conduit or container thus formed, (d) applying outside said layers a moisture-proof coating, (e) detaching the product thus formed from the former, (f) placing the conduit or container upon a plain former with a detachable spiral coil of wire thereon, (g) molding the material of the conduit or container to corrugated shape by applying pressure to it by binding upon it a spiral coil of wire with its convolutions alternating with the convolutions of the aforesaid other coil of wire, and (h) detaching the conduit or container from the former and leaving the said coils of wire in position thereon to serve as armoring.

In testimony whereof I affix my signature.

FREDERICK ELIJAH BLAISDELL.